US009602615B2

(12) United States Patent
Thiyam et al.

(10) Patent No.: US 9,602,615 B2
(45) Date of Patent: Mar. 21, 2017

(54) MASTERLESS CACHE REPLICATION (71) Applicant: Yahoo! Inc., Sunnyvale, CA (US)

(72) Inventors: Amarjit Luwang Thiyam, Bangalore (IN); Saurabh Singla, Bangalore (IN)

(73) Assignee: EXCALIBUR IP, LLC, Sunnyvale, CA (US)

( * ) Notice: Subject to any disclaimer, the term of this patent is extended or adjusted under 35 U.S.C. 154(b) by 642 days.

(21) Appl. No.: 14/061,515

(22) Filed: Oct. 23, 2013

(65) Prior Publication Data

US 2015/0113091 A1 Apr. 23, 2015

(51) Int. Cl.
*H04L 29/08* (2006.01)
*G06F 12/08* (2016.01)

(52) U.S. Cl.
CPC ...... *H04L 67/2842* (2013.01); *G06F 12/0815* (2013.01); *G06F 2212/264* (2013.01); *G06F 2212/284* (2013.01)

(58) Field of Classification Search
CPC ........... H04L 67/2842; G06F 2212/284; G06F 2212/264
USPC ......................................................... 709/214
See application file for complete search history.

(56) References Cited

U.S. PATENT DOCUMENTS

| 9,026,493 | B1* | 5/2015 | Weng | G06F 17/30575 707/614 |
| 2006/0155945 | A1* | 7/2006 | McGarvey | G06F 17/30353 711/162 |
| 2009/0177710 | A1* | 7/2009 | Holenstein | G06F 17/30578 |
| 2010/0049823 | A1* | 2/2010 | Saigo | G06F 11/2066 709/216 |
| 2010/0235431 | A1* | 9/2010 | Poluri | G06F 11/2066 709/203 |
| 2012/0226876 | A1* | 9/2012 | Kawaguchi | G06F 3/0604 711/162 |
| 2012/0259894 | A1* | 10/2012 | Varley | G06F 17/30575 707/795 |
| 2012/0278817 | A1* | 11/2012 | Oliver | G06F 9/4843 719/318 |
| 2013/0282656 | A1* | 10/2013 | O'Neill | G06F 17/30212 707/622 |

(Continued)

OTHER PUBLICATIONS

Orion Letizi, Introduction to OpenTerracotta, http://www.infoq.com/articles/open-terracotta-intro, 22pp., Feb. 12, 2007/.

(Continued)

*Primary Examiner* — Nicholas Taylor
*Assistant Examiner* — Chong G Kim
(74) *Attorney, Agent, or Firm* — Brinks Gilson & Lione (57) ABSTRACT

In an example of masterless cache replication, a processor of a server of a plurality of servers hosting a distributed application can receive a local cache event for a local data item stored in an application cache of the server. The processor can determine whether the local cache event is from another server. The processor can also determine whether a remote cache event of the other server is different from the local cache event and whether the local cache event is in conflict with at least one other cache event for the local data item. The processor can also determine whether the local cache event has a higher priority over the at least one other cache event and direct performance of the local cache event amongst the plurality of servers.

7 Claims, 5 Drawing Sheets

(56) References Cited

U.S. PATENT DOCUMENTS

| | | | | |
|---|---|---|---|---|
| 2014/0136571 A1* | 5/2014 | Bonvin | ............ | G06F 17/30318 707/792 |
| 2014/0237095 A1* | 8/2014 | Bevilacqua-Linn | .. | H04L 41/042 709/223 |
| 2015/0012657 A1* | 1/2015 | Botti | ........................ | G06F 9/00 709/226 |
| 2015/0026676 A1* | 1/2015 | Makin | ................ | G06F 9/45533 718/1 |
| 2015/0363124 A1* | 12/2015 | Rath | .................. | G06F 11/2097 709/219 |
| 2016/0048408 A1* | 2/2016 | Madhu | ................ | G06F 11/1458 718/1 |
| 2016/0173420 A1* | 6/2016 | Kesavan | ............... | H04L 51/046 709/206 |
| 2016/0188427 A1* | 6/2016 | Chandrashekar | ... | G06F 11/2007 714/4.11 |

OTHER PUBLICATIONS

Daniel Lanciana, Terracotta, Ehcache and BigMemory, http://polyawesomeism.wordpress.com/2013/06/20/terracot a-eheache-and-bigmemory/ 6pp., Jun. 20, 2013.

Jonathan Ellis Caching in Cassandra 1.1, http://www.datastax.com/dev/blog/caching-in-cassandra-1-1, 6pp., Apr. 30, 2012.

http://en.wikipedia.org/wiki/Terracotta, Inc., 3pp., retrieved Oct. 23, 2013.

http://en.wikipedia.org/wiki/Fiazeicast, 1p., retrieved Oct. 23, 2013.

\* cited by examiner

MASTERLESS CACHE REPLICATION

FIELD

Example embodiments relate to cache replication across servers in a network.

BACKGROUND

Cached data replication may be used for applications deployed across multiple servers or multiple datacenters. Consistency amongst cached data is especially desired to maintain such deployments of applications. Simultaneous writes from different datacenters or even the same datacenters can potentially result in conflicts when replicating data. Conflicts can be resolved via a master server that can guide the replication of cached data across slave servers, where updates to cached data are originated by the master and systematically communicated to slaves of the master. However, there may be disadvantages to a master in a multisite deployment of an application. For example, there is increased overhead in electing a new master in cases of the original master failing.

BRIEF DESCRIPTION OF THE DRAWINGS

The systems and methods may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Caching is a technique used to improve performance of applications, such as web applications. In the case of web applications, browsers can cache static resources like images and scripts. Some more sophisticated web applications are also caching data for one or more application program interface (API) libraries of an application. Caching such data can reduce computational costs and network resources. For example, in an application deployed across multiple servers, time to transfer data can be saved by taking advantage of caching. Additionally, multiple caches across multiple servers provide fail-safe data backup and business continuity.

While such widespread caching is useful, maintaining consistency of cached data across servers and datacenters can be challenging. One solution for widespread caching across multiple resources is to use master-slave systems that force different servers to act as a master or a slave. However, in a master-slave configuration, there can be a single point of failure. Also, for business continuity, a server acting as a master is generally kept idle, which can result in inefficient utilization of server hardware and software resources. Other solutions, such as solutions that do not require a master server, use various forms of conflict resolution to account for different conflicting operations (e.g., get, set, and delete operations) on a same piece of data happening at a same time across different servers.

Described herein is a solution using masterless cache replication to maintain consistency in cached data amongst servers and datacenters. Such a solution can provide a symmetrical system, where the servers of the system can be peers to each other. Therefore, resources are used more efficiently in that no server is a master. This can facilitate improved utilization of hardware and maintain business continuation in an application served by multiple servers. The solution can interpret simultaneous operations on the same data item across same and different machines, and can convert such data to cache operations that can facilitate maintaining cache consistency amongst machines serving a widespread application. Also, in such a solution, data can be cached minimally. For example, if there are no new updates made to a given data item, that item is not cached and/or is not periodically updated with the same data. Also, such a solution maintains multiple points of failure, which can be advantageous in that one point can back up another.

Figure 1:
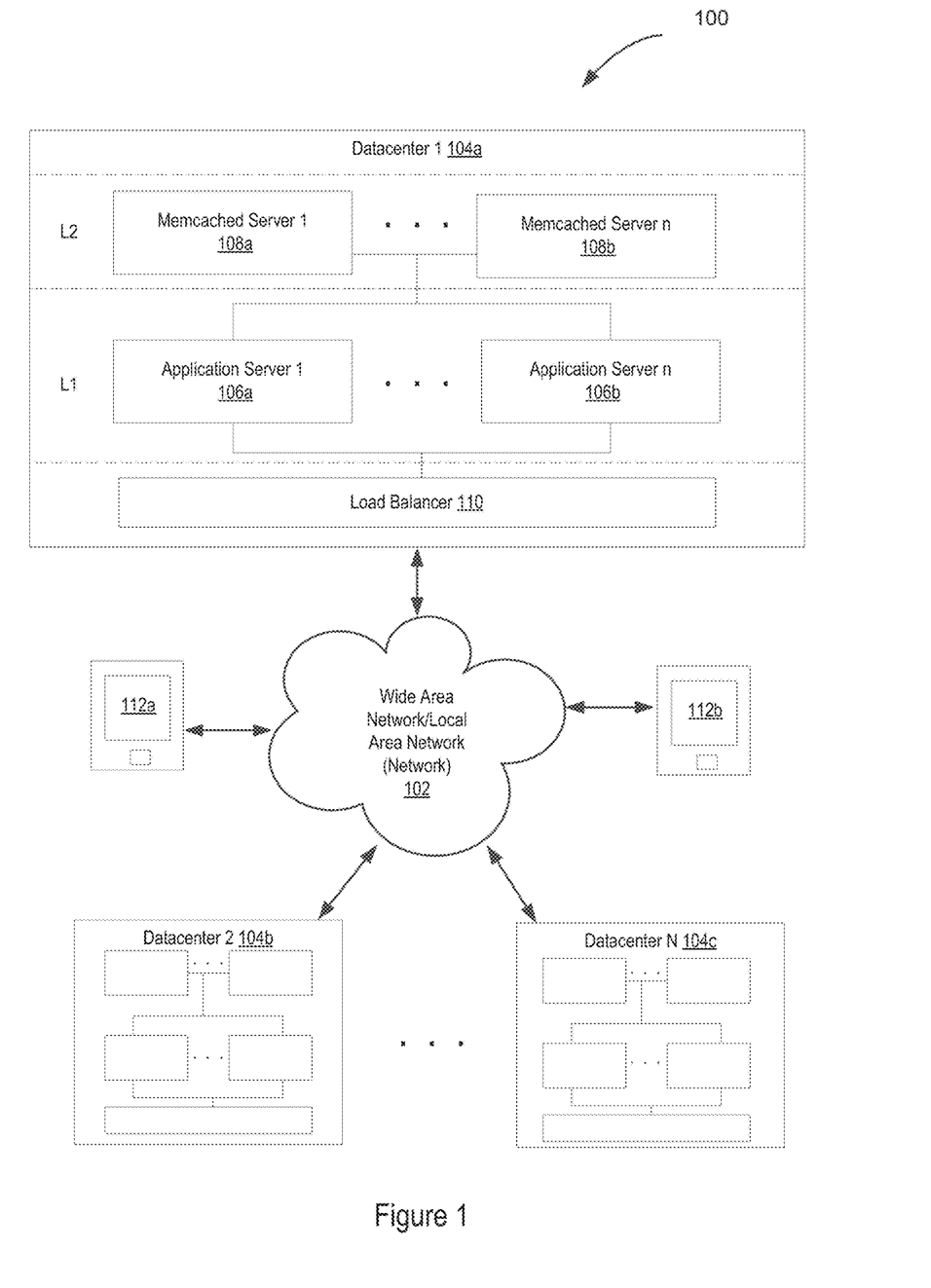
FIG. 1 is a block diagram of an example of architecture that can implement an example of a masterless cache replication system.

FIG. 1 is a block diagram of an example of a network that can implement an example of a masterless cache replication system. In FIG. 1, for example, an architecture 100 may include a variety of networks, e.g., local area network (LAN)/wide area network (WAN) 102, and a variety of devices, e.g., end-user devices 112a and 112b, application servers 106a and 106b, and memcached servers 108a and 108b. Although memcached servers are depicted in FIG. 1, other types of distributed memory caching systems can be included in the masterless cache replication system as well. An end-user device may be any device with a user interface for interacting with computer applications, such as a desktop, laptop, tablet computer, or smartphone.

The architecture 100 may couple devices so that communications may be exchanged, such as between servers, servers and end-user devices or other types of devices, including between wireless network devices coupled via a wireless network, for example. The architecture 100 may also include mass storage, such as network attached storage (NAS), a storage area network (SAN), or other forms of computer or machine readable media, for example. The architecture 100 may include the Internet, one or more local area networks (LANs), one or more wide area networks (WANs), wire-line type connections, wireless type connections, or any combination thereof. Sub-networks may employ differing architectures or may be compliant or compatible with differing protocols, may interoperate within a larger network. Various types of devices may, for example, be made available to provide an interoperable capability for differing architectures or protocols. In an example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple end-user devices with the architecture 100. A wireless network may employ stand-alone ad-hoc networks, mesh networks, Wireless LAN (WLAN) networks, cellular networks, or the like. A wireless network may further include a system of terminals, gateways, routers, or the like, coupled by wireless radio links, or the like, which may move freely, randomly or organize themselves arbitrarily, such that network topology may change, at times even rapidly.

Signal packets communicated via the architecture 100, e.g., a network of participating digital communication networks, may be compatible with or compliant with one or more protocols. Signaling formats or protocols employed may include, for example, Transmission Control Protocol/Internet Protocol (TCP/IP), User Datagram Protocol (UDP), or the like. Versions of the Internet Protocol (IP) may include IP version 4 (IPv4) or version 6 (IPv6).

The Internet refers to, for example, a decentralized global network of networks. The Internet may include local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to a network via a network access node, for example. A signal packet communicated via the Internet may, for example, be routed via a path of gateways, servers, etc., that may route the signal packet in accordance with a target address and availability of a network path to the target address.

In FIG. 1, aspects of masterless cache replication are illustrated deployed across several datacenters, e.g., datacenters 104a, 104b, and 104c. An example datacenter in a masterless cache replication may include one or more applications servers (e.g., application servers 106a and 106b), including servers that can host a distributed memory caching system control, and servers that are dedicated to caching application data of the one or more application servers (e.g., memcached servers 108a and 108b). An application deployed from an application server may operate with a level one (L1) application cache within or associated with the application (e.g., a Java application running via a Java Virtual Machine). A server deploying the application may have a respective L1 cache. Multiple servers deploying the application may each have a separate instance of the L1 cache. A server, dedicated to caching the application data, such as one of the memcached servers 108a and 108b, may operate as a level two (L2) application cache. Multiple servers dedicated to caching the application data may together hold the application data from the L1 caches of the application servers in the same datacenter Example multi-level caches may operate by checking the L1 cache first; if it hits, a processor proceeds at high speed. With such examples, if the L1 cache misses, the next cache (e.g., L2) is checked, and so on, before external memory is checked. With respect to a masterless cache replication system (e.g., the architecture 100), the application servers (e.g., servers 106a and 106b) may include respective L1 caches on the application level, and the memcached servers (e.g., servers 108a and 108b) may include L2 caches on the application level. Also, in such a system, an L2 cache at a memcached server may include entries related to entries of the respective L1 caches of each application server in the same datacenter.

In an example, L1 cache can be a static memory coupled with processor that stores information recently accessed by a processor. L2 cache similar to L1 cache can reduce access time of data by a processor. Additionally, L2 cache can use data prefetching, which can buffer application instructions and data that a processor is about to request from memory. This can also reduce data access time. Also, L2 cache can be significantly larger than L1 cache, such as at least over thirty times as large. This is due to the cost of L2 cache usually being much lower than the cost of L1 cache. Data that is requested from L2 cache can be copied to L1 cache. L2 cache may be unified, such as it may be configured to store application instructions and application data.

In a masterless cache replication system, servers of the system may all actively serve a live application, utilizing the hardware and software of the servers more efficiently than having at least one server as an idle master server. One way to enable multiple servers across multiple datacenters, such as those depicted in FIG. 1, is to interface multiple servers with a load balancer. For example, a load balancer may act as an interface between application servers of a datacenter, such as load balancer 110. Application traffic to servers, such as servers within a datacenter, may be distributed in a balanced manner using various processes, such as a round robin process. A load balancer uses various load balancing methods, such as a round robin process, in a computer network to delegate workloads across multiple computers, network links, central processing units, data storage devices, or other network resources. The load balancer may include one or more computer hardware devices and corresponding software. The load balancer may also include a multilayer switch and/or a Domain Name System (DNS) server.

In an example, servers of a datacenter may be synchronized, such as via synchronized clocks per server. Network Time Protocol (NTP) daemon and other forms on monitoring can maintain clock synchronization amongst distributed servers, including servers distributed throughout multiple datacenters.

In an example, one or more processors of one or more servers of a datacenter (such as the datacenter 104a) may work separately or in conjunction. For example, one or more processors of the application server 106a and/or the memcached server 108a may operate separately or in conjunction. These one or more servers may be part of a cluster of servers hosting a distributed application from a datacenter (such as datacenter 104a). The distributed application may be administered and/or used by end users via end-user devices, such as end-user devices 112a and 112b. Furthermore, the distributed application may be distributed over multiple clusters of multiple datacenters (such as datacenters 104b and 104c).

In an example, the processor(s) may receive an application cache event for a local data item associated with the distributed application (also referred to as a local cache event). The data item may be stored via the processor(s) in a memory queue and an application cache of the server(s), such as an application cache of the application server 106*a* and/or the memcached server 108*a*. The processor(s) may also determine whether the application cache event is from other server(s) of the cluster. As a result of the application cache event being from other server(s) of the cluster, the processor(s) may determine whether an application cache event for a corresponding remote data item at a remote cache of the other server(s) (also referred to as a remote cache event) is different from the local cache event. Further, as a result of the remote cache event being different from the local cache event, the processor(s) may direct the remote cache event to be replicated amongst servers within the datacenter, and determine whether the local cache event is in conflict with at least one other cache event for the local data item. As a result of the local cache event being in conflict with at least one other cache event for the local data item, the processor(s) may determine whether the local cache event has a higher priority over the at least one other cache event. As a result of the local cache event having the higher priority over the at least one other cache event, the processor(s) may perform the local cache event and replicate the performance of the local cache event amongst the other servers of the cluster. Also, replication may occur across servers of other datacenters hosting the distributed application, such as across servers of the datacenters 104*b* and 104*c*.

Figure 2:
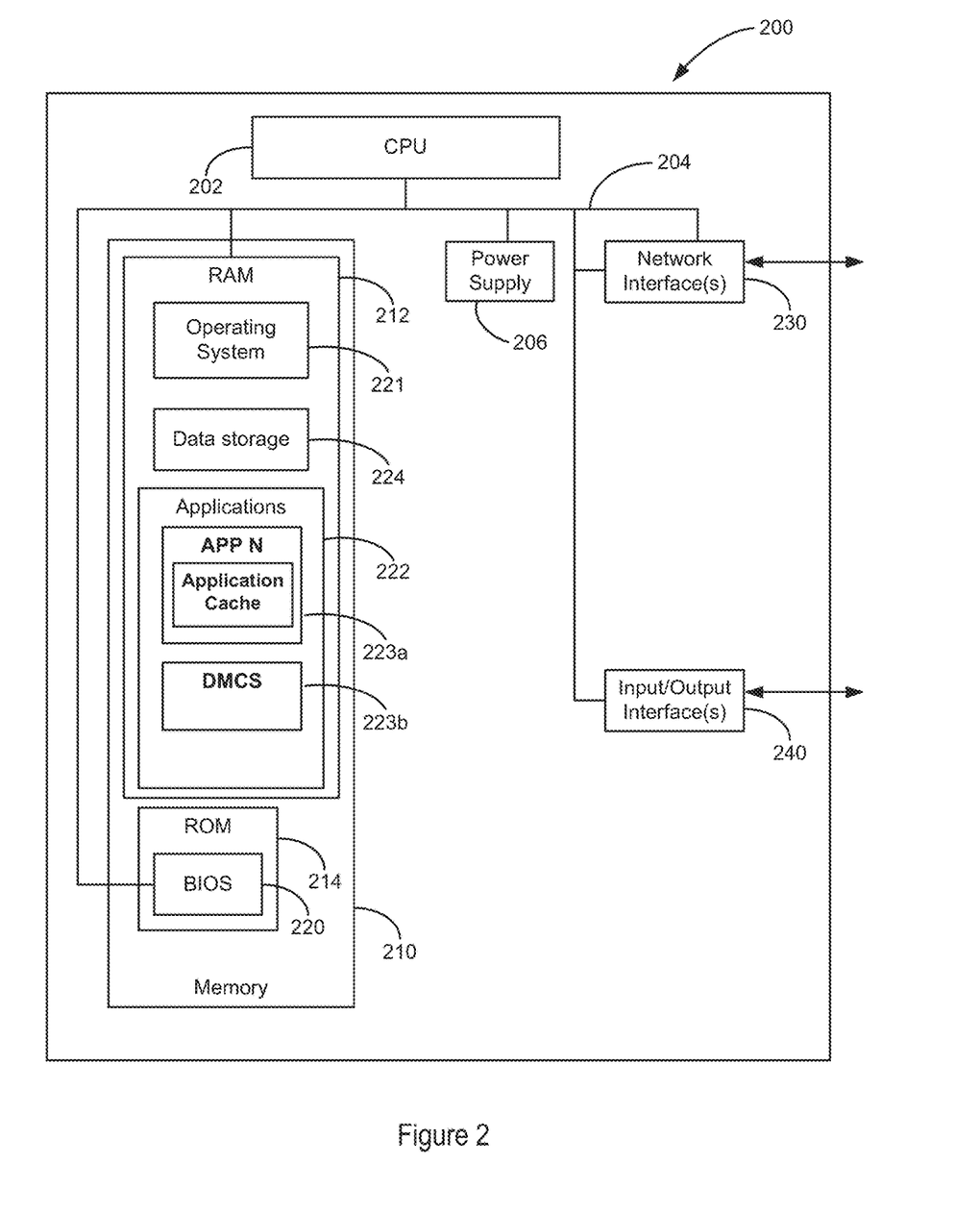
FIG. 2 is a block diagram of an example of an electronic device that can implement one or more aspects of a masterless cache replication system, such as a server deploying a distributed memory caching system (DMCS) and/or an application taking advantage of masterless cache replication via the DMCS.

FIG. 2 is a block diagram of an example of an electronic device 200 that can implement one or more aspects of a masterless cache replication system, such as a server deploying a distributed memory caching system (DMCS) and/or an application taking advantage of a masterless cache replication via the distributed memory caching system. Instances of the electronic device 200 may include servers, such as servers 106*a*, 106*b*, 108*a*, and 108*b*. The electronic device 200 can include a processor 202, memory 210, a power supply 206, and input/output components, such as network interface(s) 230 and input/output interface(s) 240, and a communication bus 204 that connects the aforementioned elements of the electronic device. The network interfaces 230 can include a receiver and a transmitter (or a transceiver), and an antenna for wireless communications. The processor 202 can be one or more of any type of processing device, such as a central processing unit (CPU). Also, for example, the processor 202 can be central processing logic; central processing logic may include hardware, firmware, software and/or combinations of each to perform function(s) or action(s), and/or to cause a function or action from another component. Also, based on a desired application or need, central processing logic may include a software controlled microprocessor, discrete logic such as an application specific integrated circuit (ASIC), a programmable/programmed logic device, memory device containing instructions, or the like, or combinational logic embodied in hardware. Also, logic may also be fully embodied as software. The memory 210, which can include random access memory (RAM) 212 or read-only memory (ROM) 214, can be enabled by one or more of any type of memory device, such as a primary (directly accessible by the CPU) and/or a secondary (indirectly accessible by the CPU) storage device (e.g., flash memory, magnetic disk, optical disk).

The RAM 212 can store data and instructions defining an operating system 221, data storage 224, and applications 222, including a DMCS 223*b* and/or an application taking advantage of masterless cache replication 223*a* via the DMCS. In an example of the masterless cache replication system, such as an example utilizing the device 200, an application taking advantage of a masterless cache replication via the DMCS (e.g., APP N 223*a*) may use an L1 application cache at its host application server, and an L2 application cache at a memcached server of the same datacenter. Example content provided by an application, may include text, images, audio, video, or the like, which may be processed in the form of physical signals, such as electrical signals, for example, or may be stored in memory, as physical states, for example.

The ROM can include basic input/output system (BIOS) 220 of the electronic device 200. The power supply 206 contains one or more power components, and facilitates supply and management of power to the electronic device 200. The input/output components can include any interfaces for facilitating communication between any components of the electronic device 200, components of external devices (such as components of other devices of the architecture 100), and end users. For example, such components can include a network card that is an integration of a receiver, a transmitter, and one or more I/O interfaces, such as input/output interface(s) 240. A network card, for example, can facilitate wired or wireless communication with other devices of a network. In cases of wireless communication, an antenna can facilitate such communication. The I/O components, such as I/O interface(s) 240, can include user interfaces such as monitors, keyboards, touchscreens, microphones, and speakers. Further, some of the I/O components, such as I/O interface(s) 240, and the bus 204 can facilitate communication between components of the electronic device 200, and can ease processing performed by the processor 202.

Where the electronic device 200 is a server, it can include a computing device that is capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Further, a server may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. Particularly, the server may be an application server that may include a configuration to provide an application, such as the masterless cache replication system, via a network to other devices. Also, an application server may, for example, host a website that can provide a user interface for the masterless cache replication system.

Figure 3:
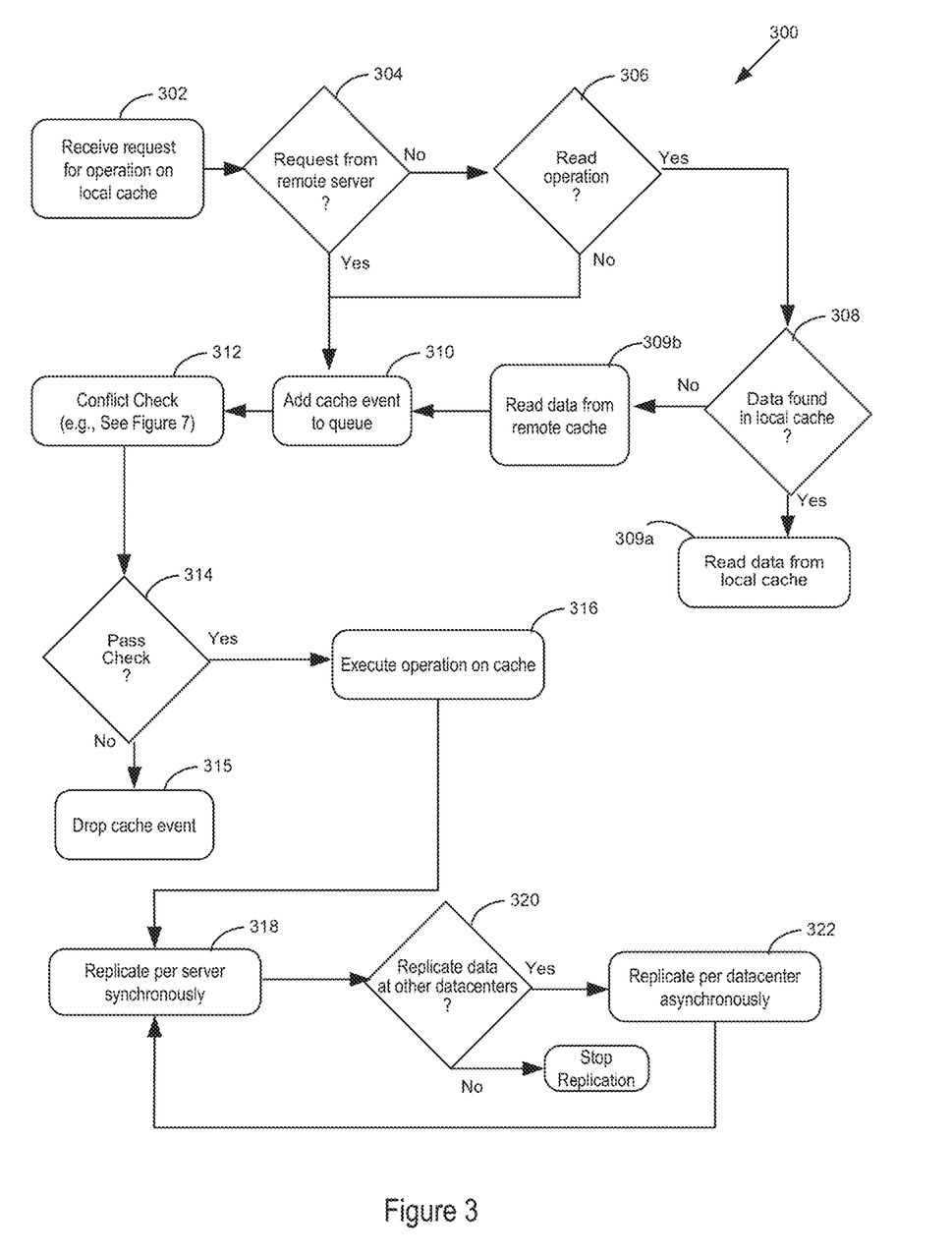
FIG. 3 is a flowchart of example masterless cache replication operations that can be performed by one or more aspects of a masterless cache replication system.

FIG. 3 is a flowchart of example masterless cache replication operations that can be performed by one or more aspects of a masterless cache replication system, such as the electronic device 200 (method 300). The method 300 may include various processes performed at least in part by a processor. In an example, a processor (e.g., the processor 202) can perform the method 300 by executing non-transitory computer readable instructions encoded in memory (e.g., the memory 210). The instructions encoded in memory may include a software aspect of the masterless cache replication system, such as a part of the DMCS 223*b*.

The method 300 may begin, at 302, with a processing aspect of an electronic device, such as a processing aspect of the application server 106*a* or 106*b*, receiving a cache event request for a cache operation. An operation on a cache is modeled as a cache event. A cache event may include an identification. The identification may be based on and/or include an associated cache key, cached data, operation type, priority, and/or time of the operation.

In an example, a key of the cache entry is added or updated when a cache miss or a cache time-to-live expiry occurs. In an example, cache entries are only populated when there is a cache miss. In such an example, the data is read back from a respective remote server and a response is cached. Also, where there is only an update request and no follow-up read request, the cache key may be invalidated, if one exists for that update. The data structures used to update or create resources may be different from the ones used to read back the resource, so in such a case a cache miss ensures consistency.

In an example, data is set in a cache, such as an application cache, only when it is fetched from a remote data source. A remote data source in an example can be a local server at a same datacenter or a server from another datacenter.

Data is replicated synchronously for the servers residing in the same datacenter and asynchronously across datacenters. For asynchronous updates to other datacenters, the replication requests are sent to the load balancers of the destination datacenter, which in turn routes the request to any one of the machines serving the application. The machine selected by the load balancer may then synchronously update the cache for all machines within that datacenter. Cache consistency may be guaranteed by a queue on that server.

Referring back to the method 300, at 304, the processing aspect may determine whether the cache event request for a cache operation is from a remote server, such as a different server from a same or different datacenter. Where the data associated with the event is not from a remote source, the processing aspect may determine whether the request includes a request for a cache read operation, at 306. It can also be determined whether corresponding data can be found for that read operation, at 308. Where the corresponding data can be found, the data is read from the local cache, at 309a. Where the corresponding data cannot be found, the data is read from a remote cache of a remote server, at 309b. Where the request includes a request for create, update, or delete cache entry operation, the processing aspect adds the corresponding cache event to a queue (at 310), such as a queue of the server receiving the request. Also, data that is read from a remote cache of a remote server at 309b, can be added to a cache event that is added to the queue.

In one example, where the data is from a remote server, the entry including the data may be checked to determine whether a respective entry at a cache of the source has been changed. In an example, updates, such as creates or deletions of objects, can result in a deletion of corresponding entry of the cache. In other words, any update to a resource on a remote data source results in a corresponding cache entry for that resource to be purged from cache. This is useful because for some remote data stores, payloads as received for a request, such as request for information, is not necessarily the same as the one sent for write operations.

Figure 7:
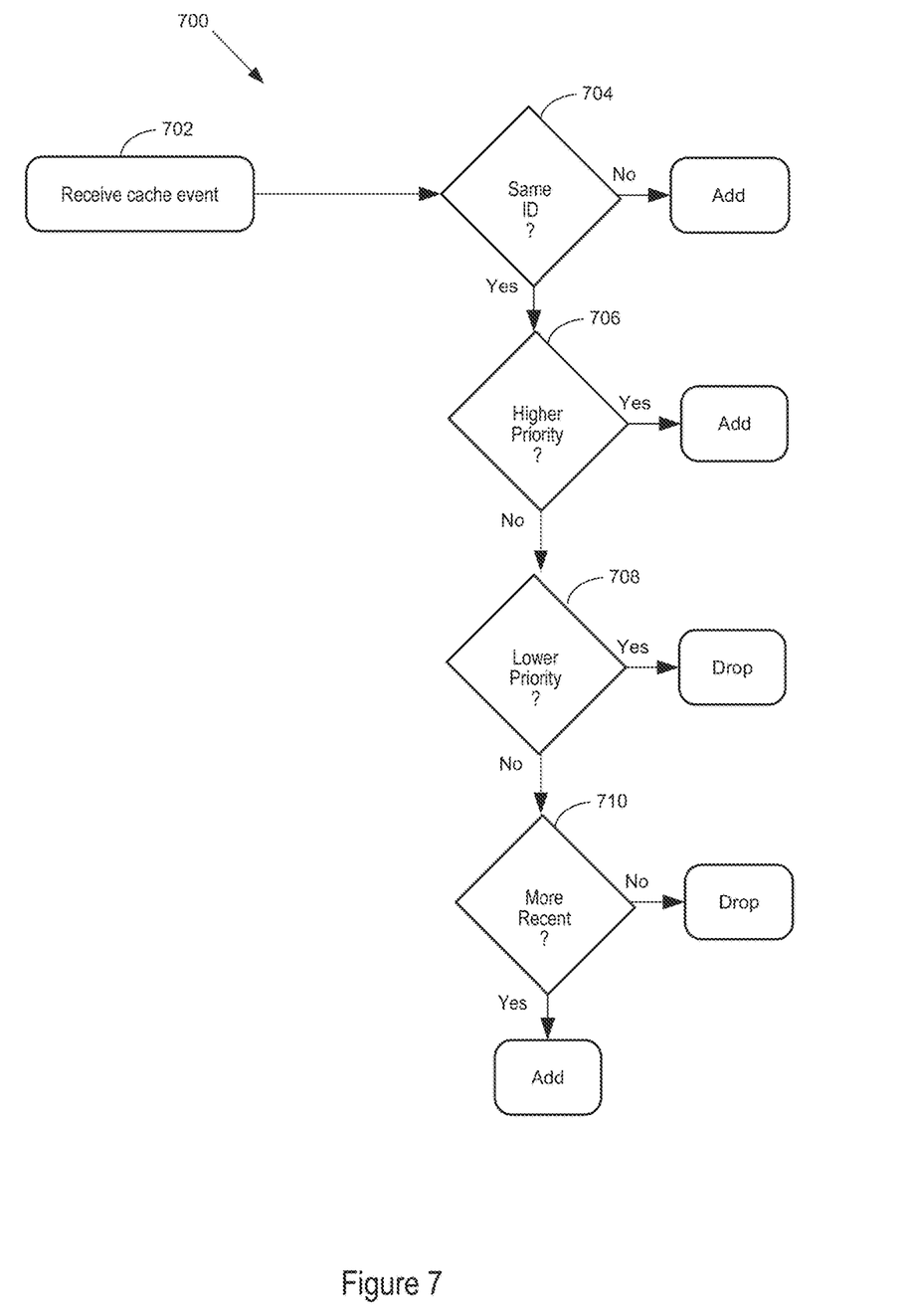
FIG. 7 is a flowchart of an example method for resolving conflict amongst cache entries that can be performed by one or more aspects of a masterless cache replication system.

At 312, the processing aspect may provide a conflict check, such as the check illustrated in FIG. 7. The conflict check, at 312, determines whether the entry is in conflict with another entry of the same data item of the cache. For example, entries at different datacenters may conflict, so these entries cannot be performed simultaneously. In other words, one entry must occur over the other, and the selection of an entry is determined by the conflict check, at 312. This conflict check, at 312, ensures that the event takes priority over competing events for the same entry before that event is dispatched for replication to other datacenters or even other servers of the same datacenter. A conflict check may reoccur per datacenter and/or per server.

Where the present received entry passes the check, at 314, in other words the entry is preferred by the system over other entries for the same data item, the corresponding operation of the cache event request is executed at a corresponding location of the local cache, at 316. Otherwise, the entry is dropped by the processing aspect, at 315 (such as dropped by the queue via a command from the processing aspect).

In addition or alternatively, in order to ensure consistency in caches, a queue can resolve conflicts where there is more than one event with the same entry key and/or ID. In an example, a cache event is either a high or a low priority. In another example, the priority may be a ranking. In an example where a cache event is either high or low priority, there may be a default value, such as low being the default value. In an example, cache delete operations (which may be triggered from a create, update, or delete of an entry) may be given the high priority instead of the low priority. Where there are more than one cache events with the same ID, the one having a highest priority is potentially added and the other(s) are knocked off. Where more than on event has the highest priority and the same ID, the most recent of the events may be added. In an example, recentness of an event may be determined by a corresponding timestamp.

When the operation is executed at 316, the operation may be further replicated at other servers. At 320, the processing aspect may determine whether the replication needs to occur within the same datacenter and/or a different datacenter. Where the replication is within the same datacenter, the replication may occur simultaneously amongst the servers of that datacenter (see 318). Where the replication occurs at servers at another datacenter, initially the replication occurs at a first server of that other data center asynchronously relative to execution of the operation at other datacenters (see 322).

A queue, such as a queue that can support the method 700 described below in conjunction with FIG. 7, may preserve access order. For example, an order of iteration of the elements in the queue may be an order in which its entries were last accessed, from least-recently accessed to most-recently accessed.

Each element in the queue may be stored as a key and value pair. This may facilitate the masterless cache replication system looking up a specific element in the queue with a time complexity of O(1). For example, instead of looking up an event by various parameters, the search is simplified by reducing the various parameters to a key.

Invoking a put value event for a key operation or get value event for a key operation may result in an access to a corresponding entry (assuming the element exists after the invocation completes). Such as invocation can change the access order. The key for such operations may become a most recently accessed element in the access order.

Removal from the queue of the least recently accessed elements may occur when new elements are inserted in the queue and/or when the queue exceeds a predetermined maximum queue size. The system may be configured to remove a configurable group of stale elements when the queue is full or approaching fullness. Grouping deletions may reduce processing overhead, instead of deleting one data item at a time.

Figure 4:
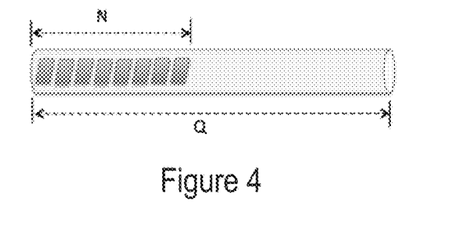
FIG. 4 is an illustration of an example queue of size Q with N number of cache entries.

FIG. 4 illustrates a queue of size Q with N number of entries. Q can be the size of the queue and N can be a number of elements present in the queue at a given point of time. The queue may operate in several ways given Q and N for three different cases; case 1, case 2, and case 3. In case 1, N=0 and the queue is empty and has no elements. In case 2, 0<N<Q, the queue has some elements, but has not reached the maximum queue size. In case 3, N=Q, the queue is full with elements. For both cases 1 and 2, since the queue has (Q−N) number of available slots, it can accommodate a new incoming element. However, for the case 3, since there are no available slots, the queue may delete the least frequently accessed element from the queue, thus providing a slot for an incoming element.

Figure 5:
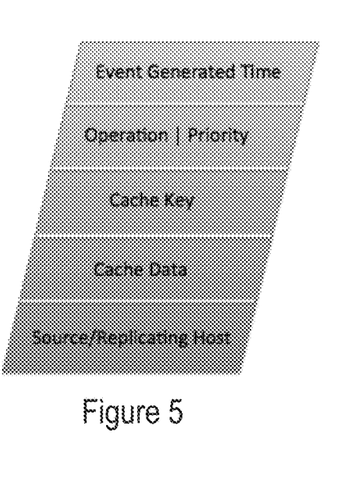
FIG. 5 is a diagram illustrating example attributes of an example cache event.

Regarding a cache event, which may be an element of the queue, such an event may encompass several properties. Some of these properties are illustrated in FIG. 5. For example, a cache event may include a time (such as a time measured in microseconds) in which a cache event is generated. A cache event may also include an operation type, a priority, a key, data associated with the key, and/or identification of a source machine of the event, for example. An operation may include a data or entry removal operation or a store operation. Priority may include a ranking such as a two-value ranking (e.g., high or low priority). Also, each operation may be configured to be associated with a priority. For example, store operations may be low priority, and delete operations may be high priority. A cache key may be a unique cache key. In an example, the key may be securely computed using a secure hash algorithm. Cached data may be a data that can be serialized into a cache key.

The source of an event may be the original source or a replicating source. For example, the source may be the first server to receive the event at a datacenter even though the event originated at a different server of a different datacenter.

Figure 6:
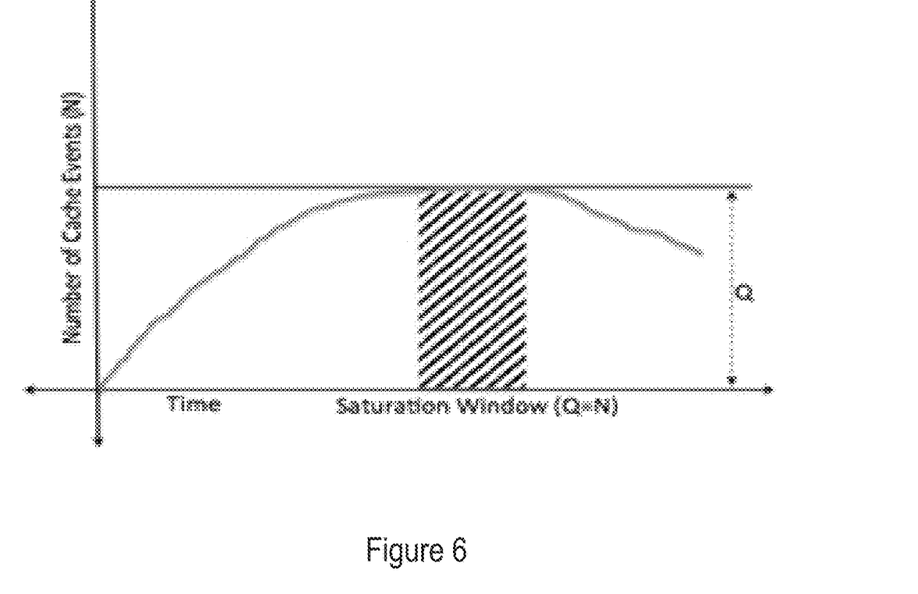
FIG. 6 is a graph illustrating example behavior of an example queue.

FIG. 6 represents example behavior of the queue with an increasing number of cached events being added to the queue. As depicted in FIG. 6, when an amount of cache events reaches a maximum size of the queue, the queue reaches a saturation level and begins to remove least frequently and/or least recently used cache events from the queue and inserts a new cache event. Also, the cache may remain saturated for a period of time (depicted and referred to as its saturation window in FIG. 6). During the saturation window, based on a configured number of elements swapped out from the queue, it is possible to bring the queue below the saturation level.

During cache replication, such as the replications 318 and 322, it is possible to have more than one cache event of a same cache entry (e.g., more than one event of a same cache key) with different cached data or operations from either a same or different server. This may result in a conflict of choosing a correct cache event. Improper conflict resolution may lead to data inconsistency among the participating servers of a widespread computer application. This may result in inconsistent features for end-users. A conflict check, such as the check at 312 or the one illustrated in FIG. 7, can resolve such conflicts. Such conflicts may occur for different types of replication events, such as source cache events, destination cache events, and cache replication operations.

A source cache event may be generated by a server that may be the origin of the event. A destination cache event is an event received by a server, which is the event's target. This target may be a server that needs to be updated in its corresponding cache. The cache event may be generated by the event's origin, such as a remote server in communication with the target. A cache replication may include a process of delivering a cache event, including cached data and/or a cache operation, from an origin to a set of targets, and each target may update or delete its own local data storage based on that cache event.

FIG. 7 is a flowchart of an example method (method 700) for resolving conflict amongst cache entries that can be performed by one or more aspects of a masterless cache replication system, such as the electronic device 200 using the queue. A processor (e.g., the processor 202) can perform the method 700 by executing non-transitory computer readable instructions encoded in memory (e.g., the memory 210). The instructions encoded in memory may include a software aspect of the masterless cache replication system, such as a part of the DMCS 223b.

The method 700 may begin, at 702, with a processing aspect of an electronic device, such as a processing aspect of the application server 106a or 106b, receiving a cache event. At 704, the processing aspect determines whether the received event is for a same cache entry of another competing event recently received by the processor or another aspect of the masterless cache replication system. Where the received event is for a different entry than any other recently received event, the event is added to the corresponding cache entry. Where there is a competing event for the same cache entry, the processing aspect determines whether the received event has a higher priority, at 706, a lower priority, at 708, or the same priority. Where the received event has a higher priority than a competing event, it is added; and where the event has a lower priority than a competing event, it is dropped. Where the received event has the same priority, the processing aspect determines whether the received event is more recent than a competing event, at 710. Where it is not, it is dropped; and where it is more recent than the competing event, it is added to the cache entry.

In an example, prior to running a conflict check, such as at 312 and/or via method 700, requesting servers may acquire a unique lock obtained per cache key. The queue used for organizing the events may be synchronized via the lock per key. In such a case, the servers of the system share a same clock. The check may include determining whether the cache event is a new event. This can be determined by checking for a key. Where there is no key there is no event, and the value in the queue may be a null value. At this point, a new event and key may be generated, which may include giving the event a priority and a generation time. Where the event is not new, it may be updated. An update may include changing the event's access priority in the queue. Also, in such a case, that event may become the last accessed event. Whether the event is new or not, where there are no competing events or the event takes priority over competing events, a processing aspect of the system continues with any operation associated with the event.

Table 1 illustrates source and destination cache events represented by a cache key. With respect to the table, operations of two replicating servers rely on the same clock and occur at the same time.

TABLE 1

| Row | Origin Machine M1 (Source CE) [Key, Operation] | Target Machine M2 (Destination CE) [Key, Operation] | Determined Operation on M2 |
| --- | --- | --- | --- |
| 1 | [001, STORE] | [001, DELETE] | DELETE |
| 2 | [002, DELETE] | [002, STORE] | DELETE |
| 3 | [003, DELETE] | [003, DELETE] | No Action |

TABLE 1-continued

| Row | Origin Machine M1 (Source CE) [Key, Operation] | Target Machine M2 (Destination CE) [Key, Operation] | Determined Operation on M2 |
| --- | --- | --- | --- |
| 4 | [004, STORE] | [004, STORE] | No Action |
| 5 | [005, STORE] | [NULL, NULL] | STORE |
| 6 | [006, DELETE] | [NULL, NULL] | DELETE |

In Row 1 of Table 1, the origin machine M1 generated a STORE operation for cache key "001". When the STORE arrives to the target machine M2, it finds that the target machine already has a cache event (CE) for the same cache key in its queue with DELETE operation having a higher priority. Since the priority of DELETE is higher than the request of STORE from the origin machine, the cache event of machine M1 is discarded at the target machine M2. In this example, both the machines M1 and M2 may replicate cache events to each other. Also, for the same cache key "001", the origin machine M1 must also have received a cache event ([001, DELETE]) from the target machine M2, and since DELETE has higher priority at the origin machine, the cache entry corresponding to key "001" will be purged at the machine M1 and the cache event in the queue of M1 will be updated with [0001, DELETE]. When these events are replicated to a third machine, since DELETE has a higher priority than STORE, the cache event ([001, STORE]) may be discarded in favor of ([001, DELETE]). The same operations may hold true for Row 2.

Rows 5 and 6 of Table 1 represent scenarios where M2's queue has no cache events for cache keys "005" and "006". In this case, M2's cache will be updated for cache key "005", whereas cache entry will be deleted for cache key "006". The same logic can be applied for replication to the third machine M3. If M3 did not have any cache events and it accepted cache events from other machines, M3 may resolve those events using Rows 5 and 6. In other words, M3 will act similarly as M2 with respect to M1.

Rows 3 and 4 of Table 1 represent scenarios where a same cache operation for the same cache key is replicated at the same time by machines M1 and M2. In this case, the clock of M1 and M2 may be the same and both of the machines have been updated with the data from the STORE operation or data has been deleted from their application cache from the DELETE operation. Therefore, when the replication event is sent from the other machine, no operation is required. However, when the same is replicated to a third machine M3, the first event may be chosen and processed.

In an example, the size of the queue may be changed according to the number of machines in the system or the number of datacenters in the system. Also, the size of the queue may be changed according to the load of the application served from the multiple servers. The size of the queue may be in flux, and may be changed automatically by the processing aspect in real-time.

In an example, a masterless cache replication system may include an operation that may include receiving, at a processor of a server of a plurality of servers hosting a distributed application, a local cache event for a local data item associated with the distributed application. The data item can be stored in a application cache of the server. Also, the method may include determining, by the processor, whether the local cache event is from another server of the plurality of servers; and where the local cache event is from the other server of the plurality of servers, determining, by the processor, whether a remote cache event for a corresponding remote data item at a remote cache of the other server is different from the local cache event. Where the remote cache event is different from the local cache event, the method may include determining, by the processor, whether the local cache event is in conflict with at least one other cache event for the local data item. Where the local cache event is in conflict with at least one other cache event for the local data item, the method may include determining, by the processor, whether the local cache event has a higher priority over the at least one other cache event. Also, where the local cache event has the higher priority over the at least one other cache event, the method may include performing, by the processor, the local cache event; and replicating the performance of the local cache event amongst other servers of the plurality of servers.

The local cache event may include an identification, and the identification may be derived from at least one of: a respective source of the local cache event, a respective cache key, at least part of respective cached data, a respective operation type of the local cache event, a predetermined priority of the local cache event, and a time associated with the local cache event. In an example, the determining whether the local cache event is from another server of the plurality of servers may be according to the identification.

The replicating of the performance of the local cache event amongst other servers of the plurality of servers may be synchronous amongst servers at a same datacenter. The replicating the performance of the local cache event amongst other servers of the plurality of servers may be asynchronous amongst servers at different datacenters.

The determining whether the local cache event has a higher priority over the at least one other cache event, may include determining whether the local cache event may include an operation having a higher operation priority over an operation of the at least one other cache event. The determining whether the local cache event has a higher priority over the at least one other cache event, may include determining whether the local cache event is more recent than the at least one other cache event, where the operations associated with the local cache event and the at least one other cache event have a same operation priority. Alternatively, the determining whether the local cache event has a higher priority over the at least one other cache event, may include merely determining whether the local cache event is more recent than the at least one other cache event.

While various embodiments of the systems and methods have been described, it will be apparent to those of ordinary skill in the art that many more embodiments and implementations are possible within the scope of the systems and methods. Accordingly, the systems and methods are not to be restricted except in light of the attached claims and their equivalents. For example, the system may include memory, which includes an application cache and instructions for masterless cache replication stored on a non-transitory computer readable medium, and a processor communicatively coupled to the memory and configured to execute the instructions to execute the abovementioned operations.

Subject matter may be embodied in a variety of different forms and, therefore, covered or claimed subject matter is intended to be construed as not being limited to any example set forth herein; examples are provided merely to be illustrative. Among other things, for example, subject matter may be embodied as methods, devices, components, or systems. Accordingly, subject matter may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. The terminology used in the specification is not intended to be limiting of example of the invention. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Likewise, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

It will be further understood that the terms "comprises," "comprising," and/or "including," when used herein, specify the presence of stated features, integers, steps, operations, elements, and/or components, but do not preclude the presence or addition of one or more other features, integers, steps, operations, elements, components, and/or groups thereof, and in the following description, the same reference numerals denote the same elements.

We claim:

1. A system operable in a first datacenter among a plurality of datacenters, the system comprising:
    memory that includes an application cache and instructions for masterless cache replication; and
    a processor, the processor communicatively coupled to the memory and configured to execute the instructions to:
    receive a local cache event for a local data item associated with a distributed application, the data item stored in the application cache;
    determine whether the local cache event originated from a remote computer;
    where the local cache event originated from the remote computer, determine whether a remote cache event for a corresponding remote data item at a remote cache of the remote computer is different from the local cache event; and
    where the remote cache event is different from the local cache event:
    determine whether the local cache event is in conflict with at least one other cache event for the local data item;
    where the local cache event is in conflict with at least one other cache event for the local data item, determine whether the local cache event has a higher priority over the at least one other cache event, respective priorities of the local cache event and the at least one other cache event being independent of time associated with the local cache event and time associated with the at least one other cache event; and
    where the local cache event has the higher priority over the at least one other cache event: perform an operation of the local cache event at the application cache; and
    direct the remote computer to perform the operation of the local cache event at the remote cache, wherein the performance of the operation of the local cache event at the remote cache is synchronous with the performance of the operation of the local event cache at the application cache where processor and the remote computer are installed in a same datacenter of the plurality of data centers, and
    wherein the performance of the operation of the local cache event at the remote cache is asynchronous with the performance of the operation of the local cache event at the application cache where the processor and the remote computer are installed at different datacenters of the plurality of datacenters.

2. The system of claim 1, wherein the local cache event includes an identification, and the identification is derived from at least one of: a respective source of the local cache event, a respective cache key, at least part of respective cached data, a respective operation type of the local cache event, a predetermined priority of the local cache event, and a time associated with the local cache event.

3. The system of claim 2, wherein the determination of whether the local cache event is from the remote computer is according to the identification.

4. The system of claim 1, wherein each respective datacenter includes a load balancer configured to direct a server within the each respective datacenter to facilitate synchronous replication of cache events amongst computers of the each respective datacenter communicatively coupled to the load balancer.

5. The system of claim 1, wherein the determination of whether the local cache event has a higher priority over the at least one other cache event further includes a determination of whether the local cache event includes an operation having a higher operation priority over an operation of the at least one other cache event.

6. The system of claim 5, wherein the determination of whether the local cache event has a higher priority over the at least one other cache event further includes a determination of whether the local cache event is more recent than the at least one other cache event, where the operations associated with the local cache event and the at least one other cache event have a same operation priority.

7. The system of claim 1, wherein the determination of whether the local cache event has a higher priority over the at least one other cache event includes a determination of whether the local cache event is more recent than the at least one other cache event.

* * * * *